Figure 1:
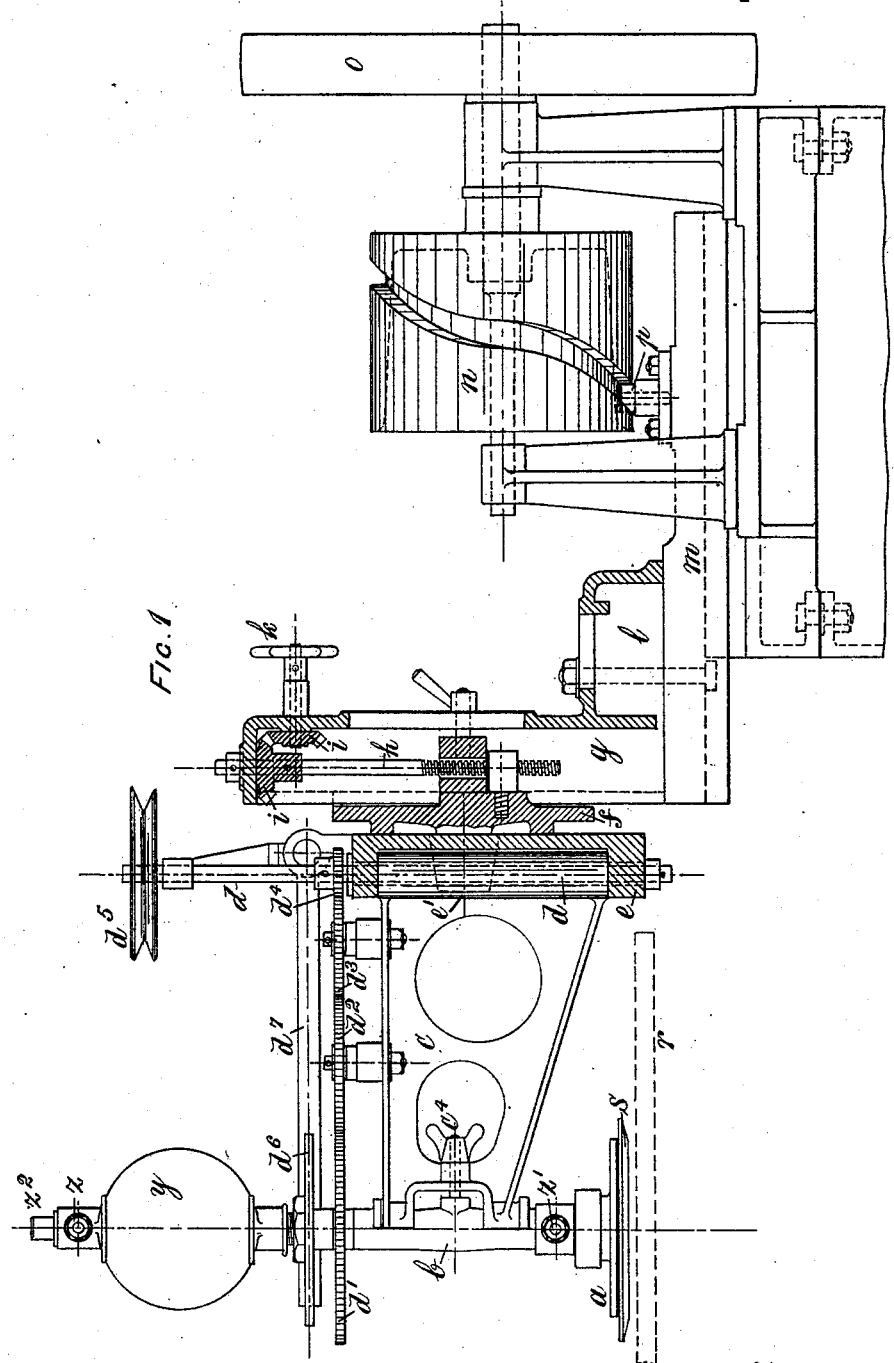

(No Model.) 2 Sheets—Sheet 1.

H. BESSON & E. N. KENT.
DEVICE FOR HOLDING GLASS WHILE BEING GROUND OR POLISHED.

No. 349,204. Patented Sept. 14, 1886.

Witnesses:
W. R. Haight
J. W. Reynolds

Inventors:
Hyppolite Besson
Ernest Neils Kent
by W. H. Babcock
Attorney

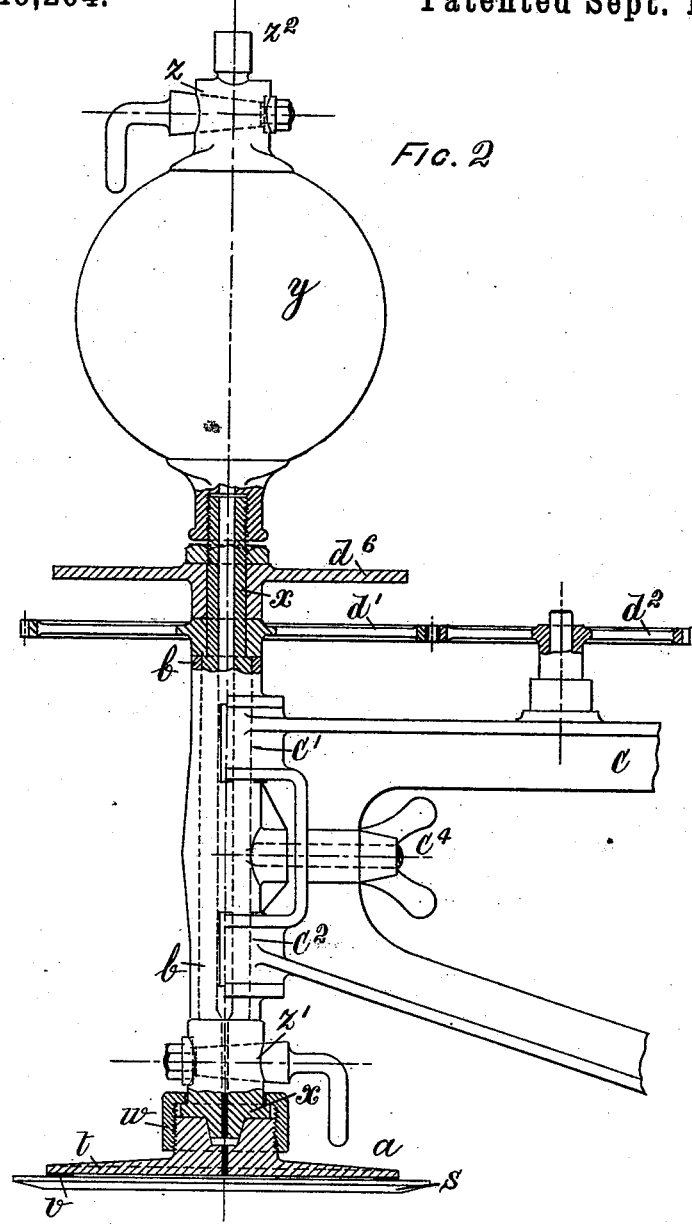

UNITED STATES PATENT OFFICE.

HYPPOLITE BESSON AND ERNEST NEILD KENT, OF BETHNAL GREEN, LONDON, COUNTY OF MIDDLESEX, ENGLAND.

DEVICE FOR HOLDING GLASS WHILE BEING GROUND OR POLISHED.

SPECIFICATION forming part of Letters Patent No. 349,204, dated September 14, 1886.

Application filed March 23, 1886. Serial No. 196,240. (No model.)

*To all whom it may concern:*

Be it known that we, HYPPOLITE BESSON, mechanical engineer, and ERNEST NEILD KENT, brush-maker, subjects of the Queen of Great Britain, both residing at Bethnal Green, London, in the county of Middlesex, England, have invented a certain new and useful Device for Holding Glass While Being Ground or Polished; and we do hereby declare the following to be a full, clear, and exact description of the invention, reference being had to the drawings accompanying the same.

Figure 1 is a side view, partly in section, of our improved device applied to a machine for grinding and polishing the edge of a glass plate. Fig. 2 shows the said device upon a larger scale, partly in section.

Similar letters of reference relate to the same parts in the several figures.

The object of our invention is to furnish a device by which glass can be firmly and securely held while being ground and polished either by machinery or by hand, so that it can be quickly and easily attached to or removed from the device, when desired, during the different processes of grinding, polishing, shaping, or beveling.

In Fig. 1 our improved device for holding glass is shown applied to a machine for grinding, shaping, and polishing glass of the kind for which we obtained Letters Patent in Great Britain dated May 9, A. D. 1884, and numbered 7,461. In this machine the glass plate is carried by the lower end of a holder, which revolves in bearings at the outer end of an oscillating frame, which can be brought into any desired position in relation to a revolving grinding-table, which revolves beneath, the holder being provided with a pattern or frame, which presses against a fixed bar, so that when the holder, with the glass plate attached, is made to revolve, the latter is reduced by the grinding-table to a shape corresponding with that of the pattern, and its edges beveled and polished, if desired, to any required angle.

$a$ is the improved holding device, attached to a spindle turning in a sleeve or tube, $b$, fixed to the outer end of the oscillating frame C, which turns upon an axis, $d$, in the carriage $e$, which is fixed upon the support $f$, on a central pivot at $e'$, so that it can be swiveled to any angle from the vertical. The support $f$ is fitted in a guide, $g$, in which it can be moved up or down by the screw $h$, beveled wheels $i$, and wheel $k$, and the guide $g$ is carried on a frame, $l$, made to traverse backward and forward in guides $m$ by the cam $n$, operated by the driving-pulley $o$, and driving the stud $p$ on the frame $l$.

The revolving grinding-table is indicated in dotted lines at $r$.

The improved device $a$, for holding the glass plate $s$, which is to be ground, shaped, and beveled, is shown on a larger scale at Fig. 2; and it consists of a plate or chuck, $t$, made to suit the shape of the glass and having a joint made between of thin india-rubber, oil-silk, or other equivalent material, $v$, a shallow recess or space being left between the glass and the chuck. The chuck is attached by a nut, $w$, to the lower end of the hollow spindle $x$, to the upper end of which is screwed a hollow metal vacuum-chamber, $y$, a cock or valve, $z$, being arranged above the chamber $y$, and a three-way cock or valve, $z'$, upon the spindle $x$ above the chuck $t$. The spindle $x$ revolves in a tube or sleeve, $b$, the exterior of which is shaped to lie in the brackets $C'$ $C^2$ upon the outer end of the oscillating frame C, where it is held by a screw and wing-nut, $C^4$. A toothed wheel, $d'$, is keyed upon the axis of the spindle $x$, and gears with the corresponding wheels, $d^2$ $d^3$, carried by the oscillating frame C, as shown in Fig. 1, and driven by the pinion $d^4$ upon the axis $d$, which axis also carries a pulley, $d^5$, which can be driven by a cord from any convenient driving-pulley.

$d^6$ is a pattern or former of the shape to which it is desired that the glass $s$ should be ground; and $d^7$ is a fixed bar or guide, against which the edge of the pattern $d^6$ is pressed by the weight of the frame $c$, when inclined, or by a separate weight or spring.

The action of the apparatus is as follows: The vacuum-chamber $y$ is connected at $z^2$ by means of the cock $z$, the three-way cock $z'$ being closed with a flexible or other pipe communicating with a vessel or chamber in which a vacuum is maintained by means of an airpump or other means. The cock $z$ is then closed, and the glass $s$ is adjusted in its place upon the chuck $t$, and pressed against the india-rubber joint $v$, the cock $z'$ being then opened, when the glass becomes strongly and firmly held in its place by the vacuum formed in the recess or space behind it. The sleeve or tube $b$ is then placed in the brackets $C' C^2$, and is fixed by the screw and nut $C^4$. The oscillating frame C is then adjusted so that the edge of the glass $s$ is at the proper height and angle of inclination to be operated upon by the revolving grinding-table $r$. The proper pattern or former $d^6$, keyed upon the hollow spindle $x$, is pressed against the guide-bar $d^7$, and the pulley $d^5$ is set in slow revolution. The edge of the glass $s$ is thus ground to an oval or other shape, corresponding with that of the pattern $d^6$, and its edge is beveled to an angle determined by the inclination of the carriage $e$, round the central pivot at $e'$. At the same time the entire apparatus is preferably made to move slowly backward and forward upon the grinder $r$ by means of the cam $n$ and stud $p$, or other equivalent means, so as to keep the grinding-table level. The three-way cock $z'$ is made so that after closing the passage through the spindle it can open a communication between the chuck $t$, and the external air through the side of the spindle $x$. When, therefore, it is desired to remove the glass $s$ from the chuck, the cock $z'$ is moved as described, and the vacuum between the glass $s$ and the chuck $t$ being destroyed, the former can be without difficulty removed. Another glass can be substituted, or the same glass replaced, by altering the cock $z'$, so as to reopen a communication with the vacuum-chamber $y$, while the glass is pressed upon the india-rubber joint $v$, and this can be repeated so long as a sufficient vacuum remains in the chamber $y$. This latter vacuum can be renewed, when necessary, by reconnecting the chamber $y$ at $z^2$ with the pipe from the exhausting apparatus or receiver.

In beveling, the glass has to be roughened, smoothed, polished, and the outline shaped by means of four different machines, and in order to keep these going we provide five interchangeable sleeves or tubes, $b$, with their internal spindles, $x$, chucks $t$, exhaust-chambers $y$, and cocks $z$ and $z'$, together with the requisite patterns or formers $d^6$, so that we have four spindles constantly working, and a fifth always ready with a fresh glass, and the vacuum restored in its chamber $y$ to replace the one removed to the next machine. Each sleeve or socket $b$ is connected or disconnected by the screw and nut $C^4$.

In cases where it is advisable to effect the roughing process only by the automatic machine, and the remaining processes by hand, the sleeve or tube $b$, which forms a carriage for the revolving spindle $x$, need not be removed, but only the glass itself, $s$, which is done, as already explained, by turning the cock $z'$, so as to admit air behind the glass, which is then removed and another substituted by placing it on the chuck $t$, and connecting the space behind it with the vacuum-chamber $y$ by turning the cock $z'$.

The device consisting of the spindle $x$, the chuck $t$, the vacuum-chamber $y$, and the two cocks $z$ $z'$, may be used as a handle or support for glass which is to be ground or polished by hand without the use of automatic machinery, the glass with the holding device being passed from one process to another until finished.

Having now described our invention, what we claim, and desire to secure by Letters Patent, is—

1. The combination of the hollow spindle $x$, chuck $t$, joint $v$, vacuum-chamber $y$, and cocks $z$ and $z'$, all arranged and operating substantially as and for the purposes described, and shown in the drawings.

2. In a glass-grinding machine, the combination of spindle $x$ with chuck $t$, joint $v$, vacuum-chamber $y$, cocks $z$ and $z'$, former $d^6$, sleeve $b$, and screw and nut $C^4$, substantially as set forth.

In witness whereof we have signed our names to this specification in the presence of two subscribing witnesses.

HYPPOLITE BESSON.
ERNEST NEILD KENT.

Witnesses:
ARTHUR E. EDWARDS,
E. SCRIVEN.